US012529998B2

(12) United States Patent
Fuji

(10) Patent No.: US 12,529,998 B2
(45) Date of Patent: Jan. 20, 2026

(54) WATCH COMPONENT, WATCH, AND METHOD FOR MANUFACTURING WATCH COMPONENT

(71) Applicant: SEIKO EPSON CORPORATION, Tokyo (JP)

(72) Inventor: Tsubasa Fuji, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 356 days.

(21) Appl. No.: 18/475,280

(22) Filed: Sep. 27, 2023

(65) Prior Publication Data

US 2024/0103443 A1 Mar. 28, 2024

(30) Foreign Application Priority Data

Sep. 28, 2022 (JP) ................................ 2022-154332

(51) Int. Cl.
*G04B 19/12* (2006.01)
*G04D 3/00* (2006.01)

(52) U.S. Cl.
CPC .......... *G04B 19/12* (2013.01); *G04D 3/0069* (2013.01); *G04D 3/0092* (2013.01)

(58) Field of Classification Search
None
See application file for complete search history.

(56) References Cited

U.S. PATENT DOCUMENTS

2021/0405586 A1 12/2021 Hoshino et al.

FOREIGN PATENT DOCUMENTS

JP 2022-011410 A 1/2022

*Primary Examiner* — Richard H Kim
(74) *Attorney, Agent, or Firm* — Harness, Dickey & Pierce, P.L.C.

(57) ABSTRACT

A watch component includes a substrate including a first region where a plurality of first recesses is formed in a surface, and a second region where a plurality of second recesses is formed in the surface, and a multilayer film covering at least a part of the first region and the second region. In a cross-sectional view obtained by cutting the substrate in a thickness direction, the plurality of first recesses is defined by a first side, and a second side tilted with respect to the first side and being in contact with the first side at an end portion. In the cross-sectional view, the plurality of second recesses is defined by a third side, and a fourth side tilted with respect to the third side and being in contact with the third side at an end portion. In the cross-sectional view, an angle of an inclination of the second side with respect to a direction orthogonal to the thickness direction of the substrate and an angle of an inclination of the fourth side with respect to the direction orthogonal to the thickness direction of the substrate are different from each other. In plan view as viewed from the thickness direction of the substrate, the first region and the second region have a value of a brightness L* in a L*a*b* color space of 5 or greater and 20 or less.

17 Claims, 11 Drawing Sheets

WATCH COMPONENT, WATCH, AND METHOD FOR MANUFACTURING WATCH COMPONENT

The present application is based on, and claims priority from JP Application Serial Number 2022-154332, filed Sep. 28, 2022, the disclosure of which is hereby incorporated by reference herein in its entirety.

BACKGROUND

1. Technical Field

The present disclosure relates to a watch component, a watch, and a method for manufacturing the watch component.

2. Related Art

JP-A-2022-11410 discloses a watch dial in which a protrusion is formed on a substrate through laser processing, and a covering layer is formed around the protrusion. In the watch dial of JP-A-2022-11410, the protrusion is formed through laser processing so that intended irregularity patterns can be created, and the decorative and design properties can be enhanced.

In JP-A-2022-11410, it is difficult to form black patterns with slight brightness differences while intended irregularity patterns can be formed on the surface of the substrate.

SUMMARY

A watch component of the present disclosure includes: a substrate including a first region where a plurality of first recesses is formed in a surface, and a second region where a plurality of second recesses is formed in the surface, and a multilayer film covering at least a part of the first region and the second region, in which, in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and in plan view as viewed from the thickness direction of the substrate, the first region and the second region have a value of a brightness L* in a L*a*b* color space of 5 or greater and 20 or less.

A watch component of the present disclosure includes: a substrate including a first region where a plurality of first recesses is formed in a surface, and a second region where a plurality of second recesses is formed in the surface, and a multilayer film covering at least a part of the first region and the second region, in which, in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and the multilayer film includes three or more layers of a color absorption film composed of a material including Cr.

A watch of the present disclosure includes the watch component described above.

A method for manufacturing a watch component of the present disclosure is a method for manufacturing a watch component, the watch component including: a substrate including a first region where a plurality of first recesses is formed in a surface, and a second region where a plurality of second recesses is formed in the surface, and a multilayer film covering at least a part of the first region and the second region, the method including: forming the plurality of first recesses and the plurality of second recesses in a surface of the substrate, and stacking the multilayer film in at least a part of the first region of the substrate where the plurality of first recesses is formed and the second region of the substrate where the plurality of second recesses is formed, in which, in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and in plan view as viewed from the thickness direction of the substrate, the first region and the second region have a value of a brightness L* in a L*a*b* color space of 5 or greater and 20 or less.

A method for manufacturing a watch component of the present disclosure is a method for manufacturing a watch component, the watch component including: a substrate including a first region where a plurality of first recesses is formed in a surface, and a second region where a plurality of second recesses is formed in the surface, and a multilayer film covering at least a part of the first region and the second region, the method including: forming the plurality of first recesses and the plurality of second recesses in a surface of the substrate, and stacking the multilayer film in at least a part of the first region of the substrate where the plurality of first recesses is formed and the second region of the substrate where the plurality of second recesses is formed, in which, in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and the multilayer film includes three or more layers of a color absorption film composed of a material including Cr.

A watch of the present disclosure includes a watch component manufactured by the above-described method for manufacturing a watch component.

DESCRIPTION OF EMBODIMENTS

First Embodiment

A watch 1 according to an embodiment of the present disclosure is described below with reference to the drawings.

Figure 1:
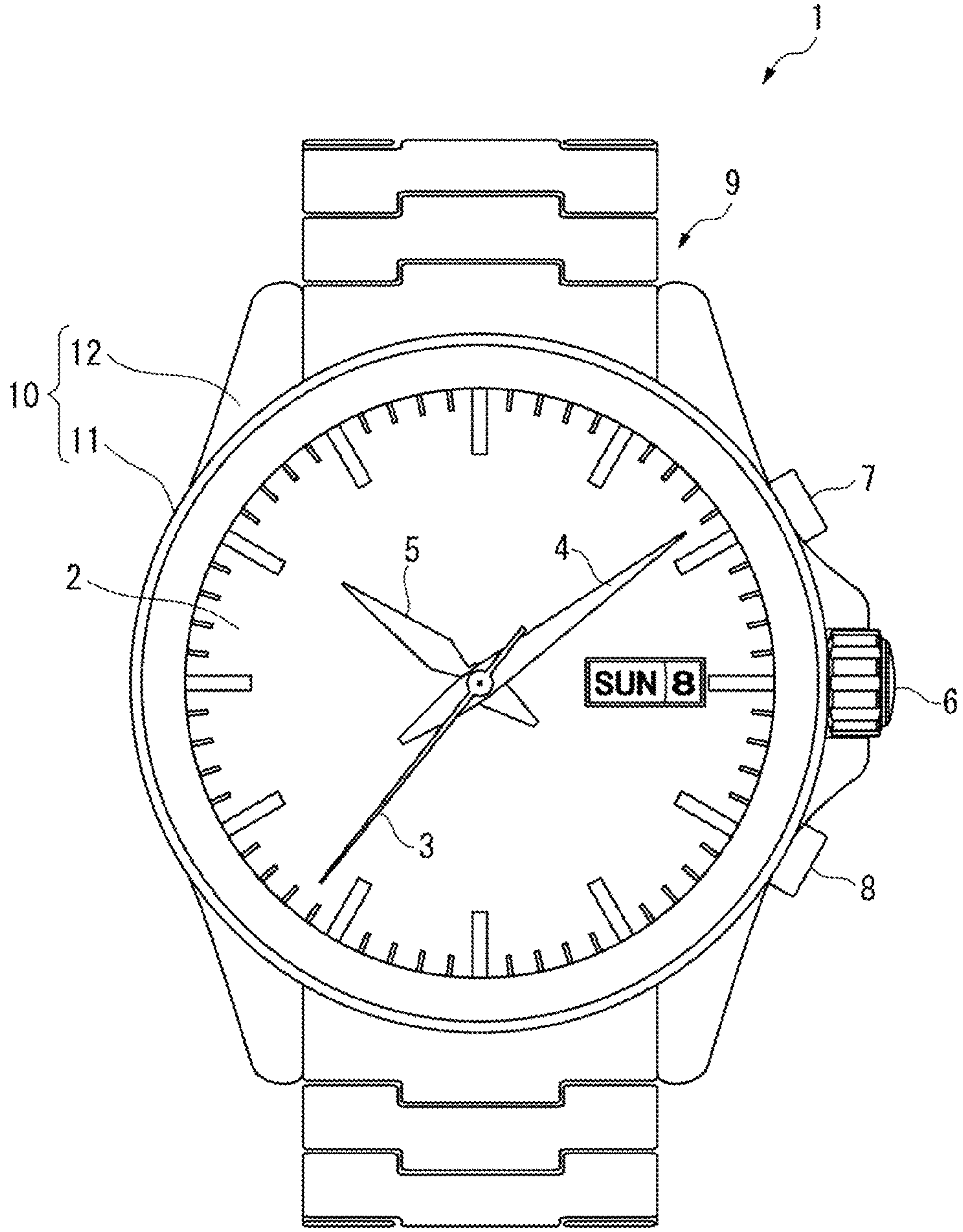
FIG. 1 is a front view illustrating a watch of a first embodiment.

FIG. 1 is a front view illustrating the watch 1. In the first embodiment, the watch 1 is configured as a wristwatch worn on a user's wrist.

As illustrated in FIG. 1, the watch 1 includes a case 10 made of a metal. Inside the case 10, the watch 1 includes a disc-shaped dial 2, a seconds hand 3, a minute hand 4, an hour hand 5, a crown 6, an A-button 7, and a B-button 8. A band 9 is attached to the case 10.

The case 10 also includes a case body 11 and bows 12. The case body 11 houses therein the dial 2, the seconds hand 3, the minute hand 4, the hour hand 5, and the like described above. The bows 12 are provided at the 6 and 12 o'clock positions of the case body 11. A band 9 is attached to each bow 12 with a spring bar not illustrated in the drawing, or the like.

Note that the dial 2 is an example of the watch component of the present disclosure.

Figure 2:
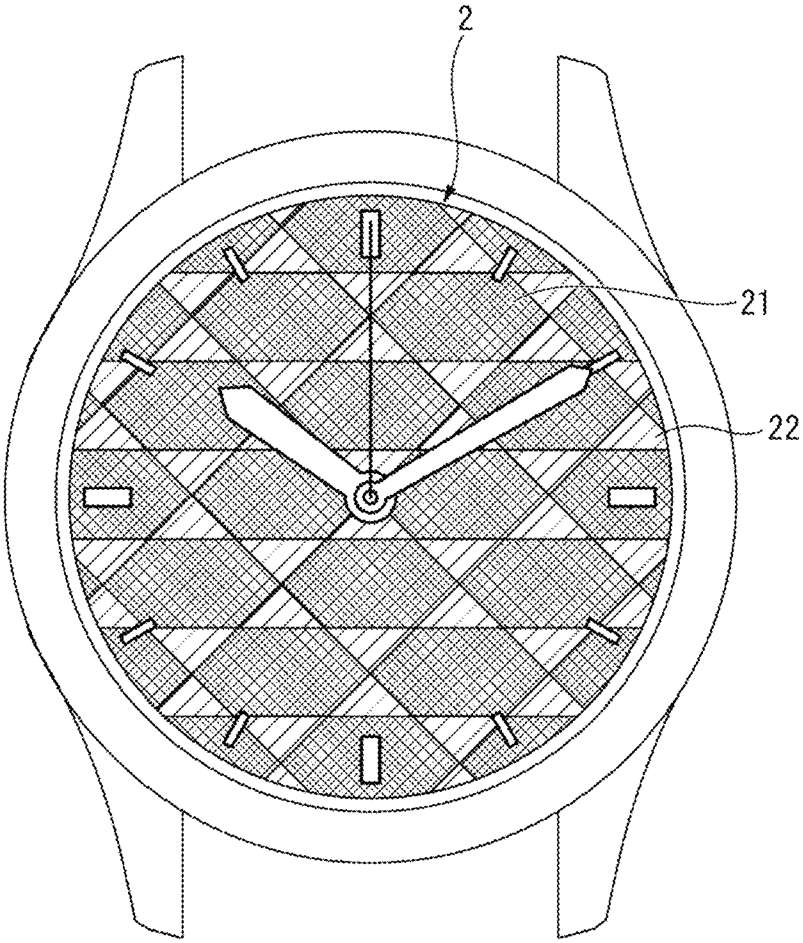
FIG. 2 is a front view schematically illustrating a dial of the first embodiment.

FIG. 2 is a front view schematically illustrating the dial 2.

As illustrated in FIG. 2, in this embodiment, the dial 2 includes a first region 21 and a second region 22 with different visually recognized colors.

Note that the first region 21 and the second region 22 are visually recognized as black with low brightness, but in FIG. 2, the first region 21 is represented by a grid pattern, and the second region 22 is represented by a striped pattern.

Figure 3:
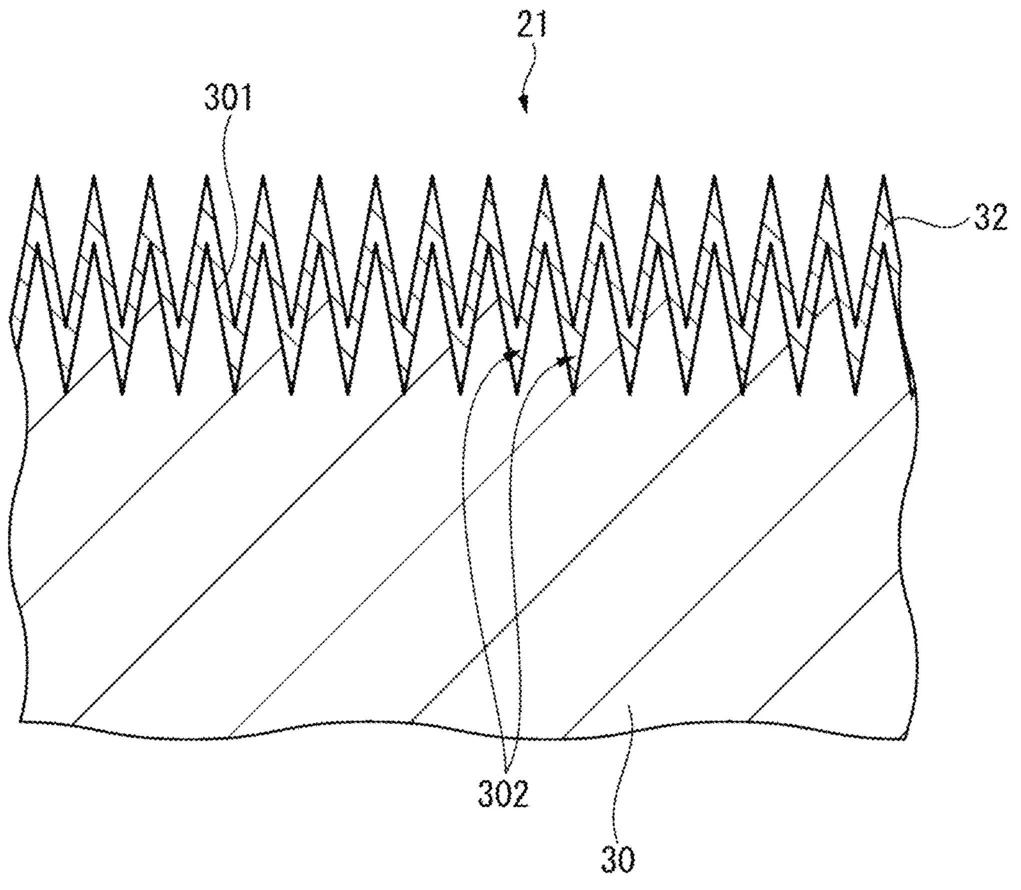
FIG. 3 is a cross-sectional view illustrating a main part of a first region of the dial of the first embodiment.
Figure 4:
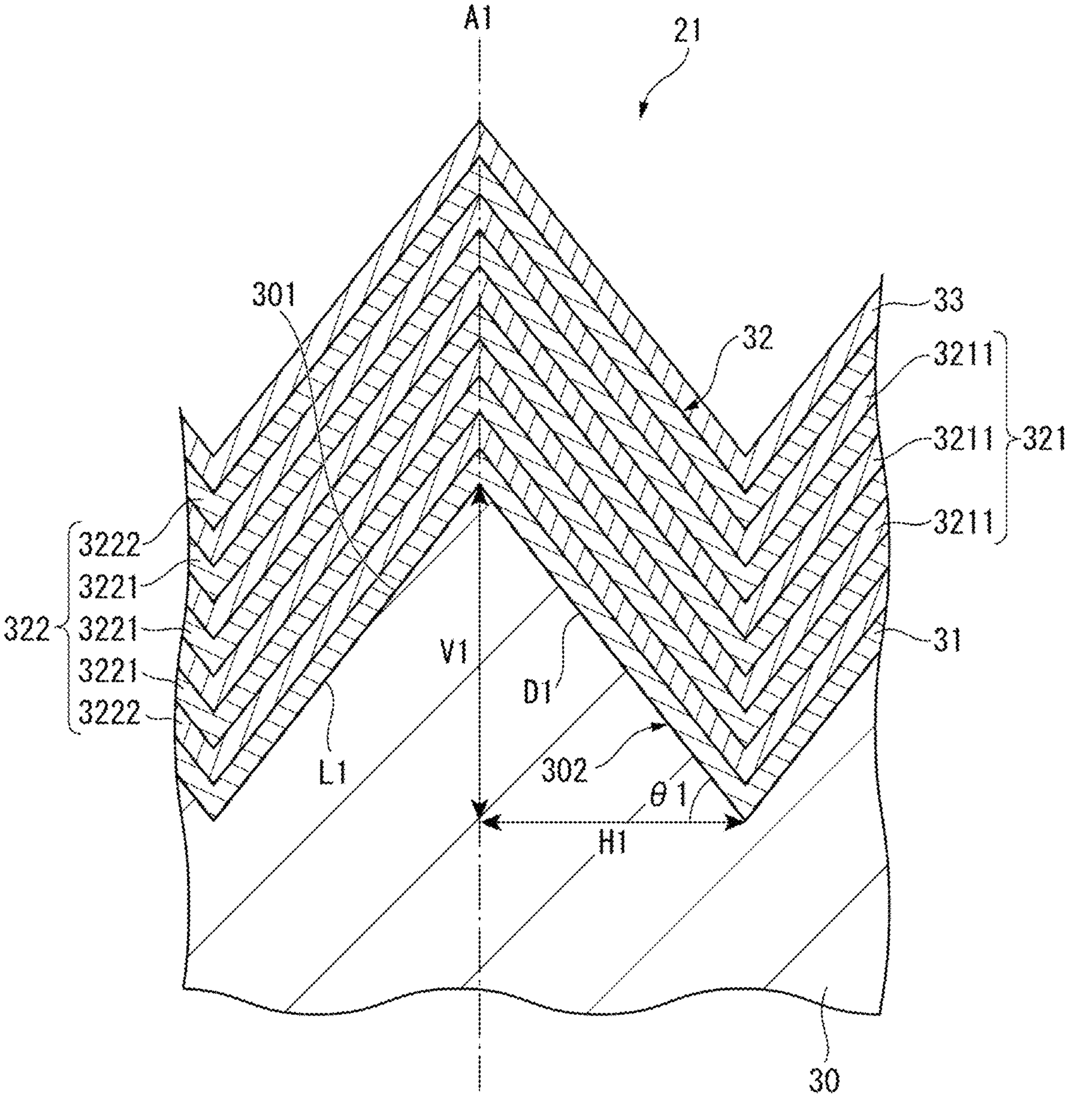
FIG. 4 is an enlarged cross-sectional view illustrating a main part of the first region of the dial of the first embodiment.
Figure 5:
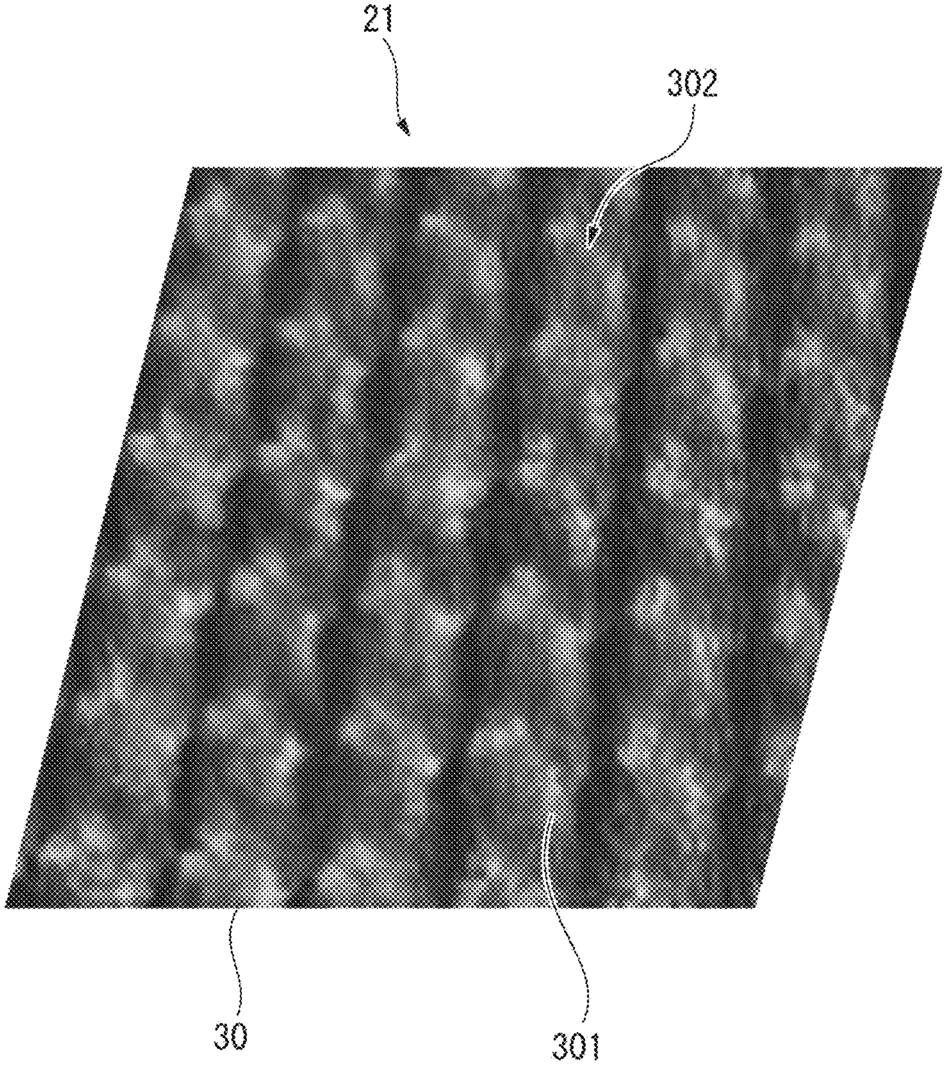
FIG. 5 is a perspective view illustrating a main part of the first region of the dial of the first embodiment.

FIG. 3 is a cross-sectional view illustrating a main part of the first region 21, FIG. 4 is an enlarged cross-sectional view illustrating a main part of the first region 21, and FIG. 5 is an enlarged perspective view illustrating a main part of the first region 21. Note that FIGS. 3 and 4 are cross-sectional views obtained by cutting the substrate 30 in the dial 2 in the thickness direction.

As illustrated in FIGS. 3 to 5, the first region 21 of the dial 2 is composed of a substrate 30, a foundation layer 31, a multilayer film 32, and a protective layer 33. In this embodiment, the entirely of the substrate 30 is covered with the foundation layer 31, the multilayer film 32, and the protective layer 33. Specifically, the foundation layer 31, the multilayer film 32, and the protective layer 33 are stacked so as to cover the entirety of a surface 301 of the substrate 30.

Note that the first region 21 is not limited to the above-mentioned configuration, and the foundation layer 31, the multilayer film 32, and the protective layer 33 may be stacked so as to cover a part of the surface 301 of the substrate 30, for example.

Substrate

The material of the substrate 30 is composed of a metal such as iron, brass, and aluminum, resin, glass or the like. Note that when the substrate 30 is composed of resin, the resin may be a non-light transmissive resin that does not transmit light, or a light transmissive resin that transmits light. In this embodiment, a plurality of first recesses 302 is formed in the surface 301 of the substrate 30 in the first region 21.

First Recess

In a cross-sectional view obtained by cutting the substrate 30 in the thickness direction, the first recess 302 is defined by a first straight side L1, and a first oblique side D1 tilted with respect to the first straight side L1 and being in contact with the first straight side L1 at an end portion. The first straight side L1 is tilted such that it is line-symmetric with the first oblique side D1 with respect to a symmetry axis A1 extending in the thickness direction of the substrate 30. More specifically, in this embodiment, as illustrated in FIG. 5, the first recess 302 is formed such that a plurality of cone-shaped protrusions is formed in the surface 301.

In addition, the angle of the first oblique side D1 with respect to the direction orthogonal to the thickness direction of the substrate 30 is $\theta 1$.

Note that the first straight side L1 is an example of the first side of the present disclosure, and the first oblique side D1 is an example of the second side of the present disclosure.

In this embodiment, the first recess 302 is formed such that the ratio of a length V1 of the first oblique side D1 along the thickness direction of the substrate 30 with respect to a length H1 of the first oblique side D1 along the direction orthogonal to the thickness direction of the substrate 30 is greater than 1/6 and less than 1. Specifically, the first recess 302 is formed such that the ratio of V1 and H1 is greater than 1:6 and less than 1:1.

In other words, the first recess 302 is formed such that when the length V1 of the first oblique side D1 with respect to the thickness direction of the substrate 30 is 1, the length H1 of the first oblique side D1 with respect to the direction orthogonal to the thickness direction of the substrate 30 is less than 6 and greater than 1, i.e., H1 is less than six times V1 and greater than one times V1.

Foundation Layer

The foundation layer 31 is stacked on the surface 301 of the substrate 30. In this embodiment, the foundation layer 31 is composed of plating such as Ni, for example. In this embodiment, by stacking the foundation layer 31 on the surface 301 of the substrate 30, the multilayer film 32 can be easily stacked.

Multilayer Film

The multilayer film 32 includes a color absorption film 321 and a color adjustment film 322, and is stacked on the foundation layer 31.

The color absorption film 321 is formed with a metal. Note that the metal making up the color absorption film 321 may be Ag, Pt, Au, Cu, Al, Cr, Sn, Fe, Ti or the like, or their alloys.

The method for forming the color absorption film 321 is not limited, but examples of the method include ion-assisted deposition, ion plating vapor deposition, vacuum deposition, and a sputtering method. In this manner, the layer composition of the multilayer film 32 can be arbitrarily changed.

In this embodiment, the color absorption film 321 includes three layers of a chromium color absorption film 3211 composed of a material including Cr. In this manner, the reflectance of light incident on the multilayer film 32 can be reduced.

The color adjustment film 322 is a film that adjusts the color tone through optical interference. In this embodiment, the color adjustment film 322 is composed of a multilayer film including an inorganic film. More specifically, the color adjustment film 322 may be composed of a material including at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, or $NdF_3$. In this manner, since these inorganic substances have high chemical stability, high stability and durability of the external appearance as a watch component can be achieved. Further, the range of the variation of the black with low values of the brightness L* can be increased.

In this embodiment, the color adjustment film 322 includes an aluminum oxide color adjustment film 3221 composed of a material including $Al_2O_3$, and a silicon dioxide color adjustment film 3222 composed of a material including $SiO_2$. The chromium color absorption film 3211 is stacked on the aluminum oxide color adjustment film 3221. Specifically, in this embodiment, the multilayer film 32 includes a plurality of portions where the chromium color absorption film 3211 composed of a material including Cr and the aluminum oxide color adjustment film 3221 composed of a material including $Al_2O_3$ are stacked. In this manner, the reflectance of light incident on the multilayer film 32 can be reduced, and thus black with a much lower value of the brightness L* can be achieved.

Note that the multilayer film 32 is not limited to the above-mentioned configuration, and the order of the color absorption film 321 and the color adjustment film 322 can be arbitrarily set.

Note that the method for forming the color adjustment film 322 is not limited, but examples of the method include ion-assisted deposition, ion plating vapor deposition, vacuum deposition, and a sputtering method. In this manner, the layer composition of the multilayer film 32 can be arbitrarily changed.

Protective Layer

The protective layer 33 is a transparent layer stacked on the surface of the multilayer film 32. In this embodiment, the protective layer 33 is formed with a transparent resin such as an acrylic resin.

Second Region 22

Figure 6:
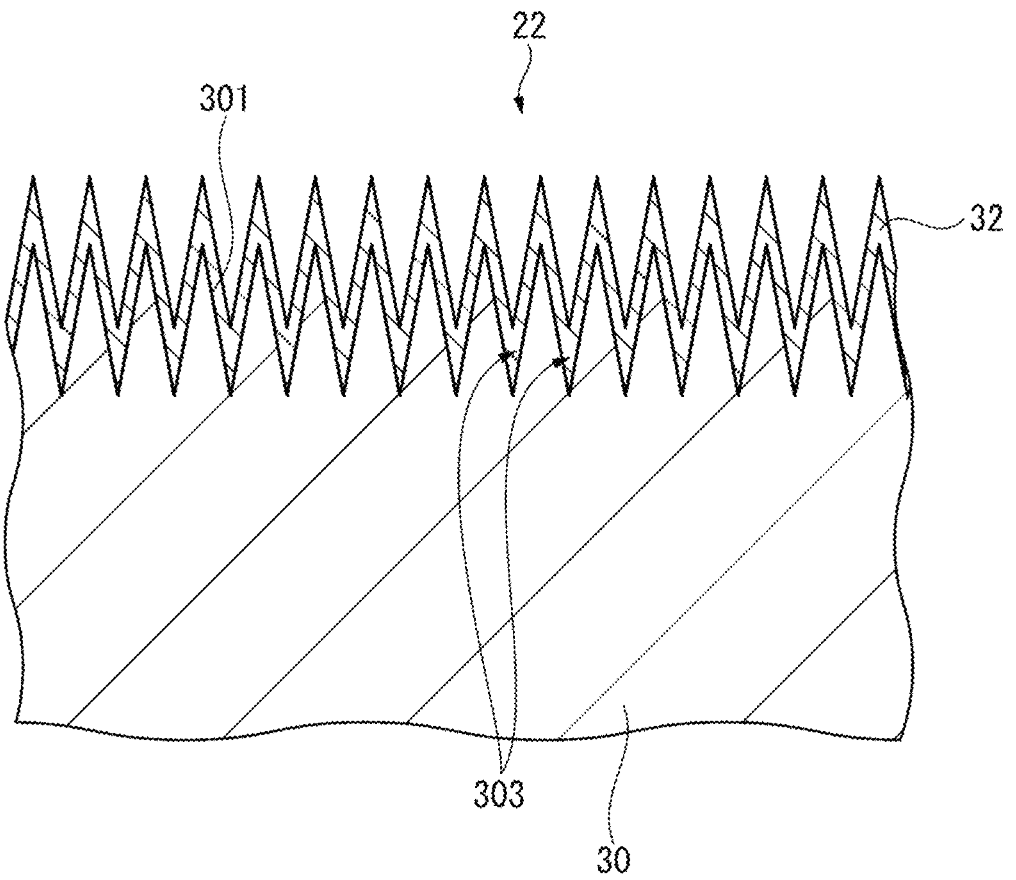
FIG. 6 is a cross-sectional view illustrating a main part of the first region of the dial of the first embodiment.
Figure 7:
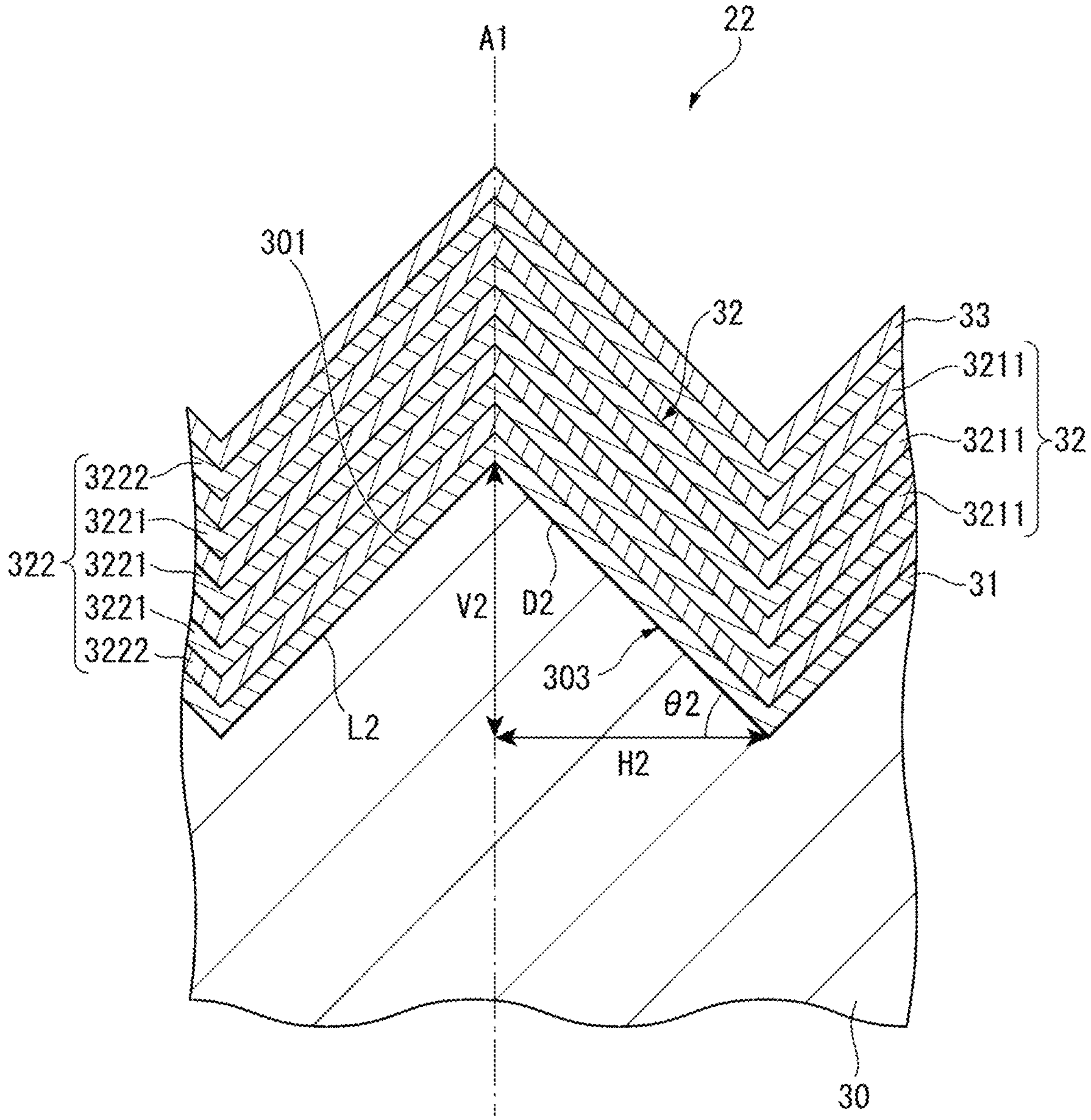
FIG. 7 is an enlarged cross-sectional view illustrating a main part of a second region of the dial of the first embodiment.
Figure 8:
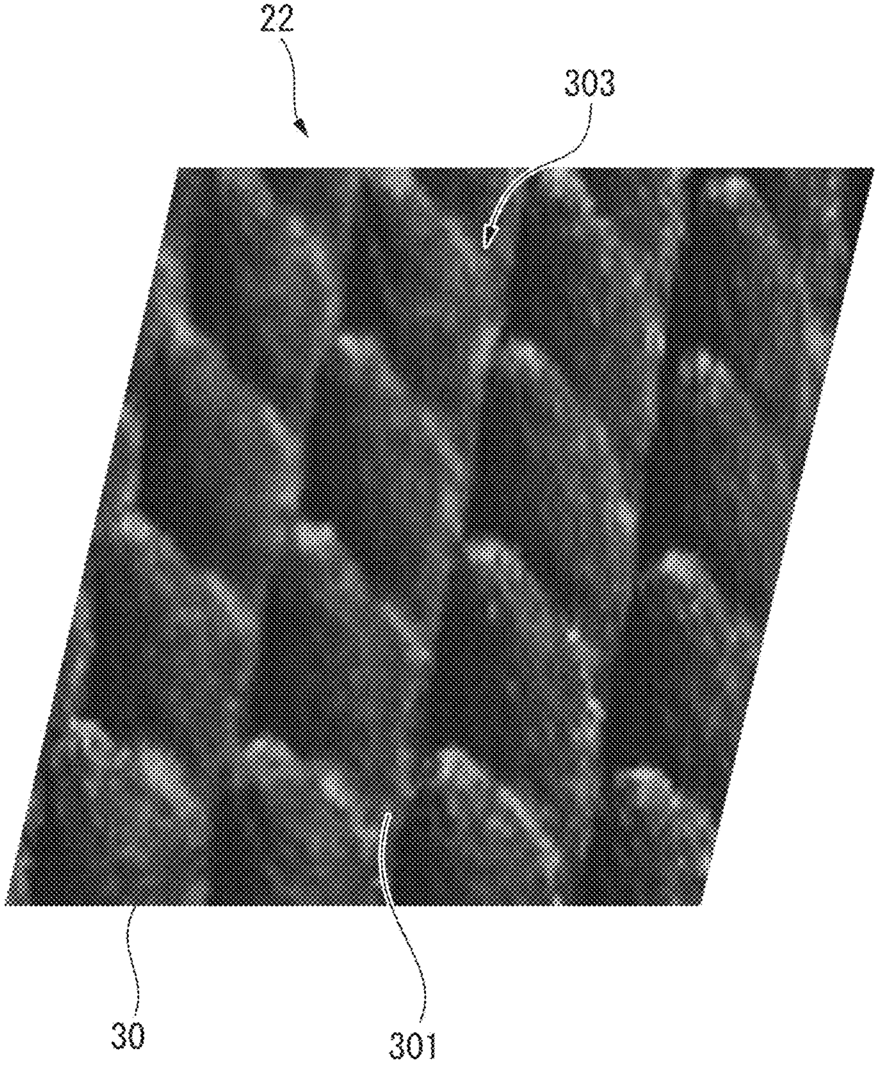
FIG. 8 is a perspective view illustrating a main part of the second region of the dial of the first embodiment.

FIG. 6 is a cross-sectional view illustrating a main part of the second region 22, FIG. 7 is an enlarged cross-sectional view illustrating a main part of the second region 22, and FIG. 8 is an enlarged perspective view illustrating a main part of the second region 22. Note that FIGS. 6 and 7 are cross-sectional views obtained by cutting the substrate 30 in the dial 2 in the thickness direction.

As illustrated in FIGS. 6 to 8, the second region 22 of the dial 2 includes the substrate 30, the foundation layer 31, the multilayer film 32, and the protective layer 33 described above.

In this embodiment, a plurality of second recesses 303 is formed in the surface 301 of the substrate 30 in the second region 22

Second Recess

In a cross-sectional view obtained by cutting the substrate 30 in the thickness direction, a second recess 303 is defined by a second straight line side L2, and a second oblique side D2 tilted with respect to the second straight line side L2 and being in contact with the second straight line side L2 at an end portion. As with the above-described first recess 302, the second straight line side L2 is tilted such that it is line-symmetric with the second oblique side D2 with respect to the symmetry axis A1 extending in the thickness direction of the substrate 30. More specifically, in this embodiment, the second recess 303 is formed such that a plurality of cone-shaped protrusions is formed in the surface 301 as illustrated in FIG. 8.

In addition, the angle of the second oblique side D2 with respect to the direction orthogonal to the thickness direction of the substrate 30 is θ2.

Note that the second straight line side L2 is an example of the third side of the present disclosure, and the second oblique side D2 is an example of the fourth side of the present disclosure.

In addition, as with the above-described first recess 302, the second recess 303 is formed such that the ratio of a length V2 of the second oblique side D2 along the thickness direction of the substrate 30 with respect to a length H2 of the second oblique side D2 along the direction orthogonal to the thickness direction of the substrate 30 is greater than 1/6 and less than 1. Specifically, the second recess 303 is formed such that the ratio of V2 and H2 is greater than 1:6 and less than 1:1.

In other words, the second recess 303 is formed such that when the length V2 of the second oblique side D2 with respect to the thickness direction of the substrate 30 is 1, the length H2 of the second oblique side D2 with respect to the direction orthogonal to the thickness direction of the substrate 30 is less than 6 and greater than 1, i.e., H2 is less than six times V2 and greater than one times V2.

In this embodiment, the first recess 302 and the second recess 303 are formed such that an angle θ1 of the first oblique side D1 in the first recess 302 is greater than an angle θ2 of the second oblique side D2 in the second recess 303.

Specifically, the first recess 302 and the second recess 303 are formed such that the ratio of V1 with respect to H1 in the first recess 302 and the ratio of V2 with respect to H2 in the second recess 303 are different from each other.

For example, the first recess 302 and the second recess 303 are formed such that the ratio of V1 with respect to H1 in the first recess 302 is 1/3, and that the ratio of V2 with respect to H2 in the second recess 303 is 1/4.

In this embodiment, since the first recess 302 and the second recess 303 are formed such that the angle θ1 of the first oblique side D1 is greater than the angle θ2 of the second oblique side D2, light incident on the first recess 302 is more repeatedly reflected inside the recess than light incident on the second recess 303. Thus, the light reflectance of the first recess 302 is lower than that of the second recess 303. In this manner, the value of the brightness L* is lower in the first region 21 than in the second region 22. In other words, in the portion where a lower brightness of the black is desired, the angle of the oblique side in the recess is increased.

Method for Manufacturing Dial

Next, a method for manufacturing the dial 2 is described.

First, a plurality of the first recesses 302 is formed in the surface 301 of the substrate 30 in the first region 21 of the dial 2. For example, the first recess 302 is formed through processing such as cutting processing, laser processing, chemical removal processing, polishing processing, and forging or casting processing on the surface 301 of the substrate 30. At this time, a plurality of cone-shaped protrusions is formed at the surface 301 by forming the first recess 302 such that the ratio of the length V1 of the first oblique side D1 along the thickness direction of the substrate 30 with respect to the length H1 of the first oblique side D1 along the direction orthogonal to the thickness direction of the substrate 30 is greater than 1/6 and less than 1.

Next, a plurality of the second recesses 303 is formed at the surface 301 of the substrate 30 in the second region 22 of the dial 2. For example, the second recess 303 is formed through processing such as cutting processing, laser processing, chemical removal processing, polishing processing, and forging or casting processing on the surface 301 of the substrate 30. At this time, a plurality of cone-shaped protrusions is formed at the surface 301 by forming the second recess 303 such that the ratio of the length V2 of the second oblique side D2 along the thickness direction of the substrate 30 with respect to the length H2 of the second oblique side D2 along the direction orthogonal to the thickness direction of the substrate 30 is greater than 1/6 and less than 1.

Note that the processing method for forming the first recess 302 and the second recess 303 is not limited.

In this embodiment, as described above, the first recess 302 and the second recess 303 are formed such that the angle θ1 of the first oblique side D1 in the first recess 302 is greater than the angle θ2 of the second oblique side D2 in the second recess 303. In other words, the first recess 302 and the second recess 303 are formed such that the ratio of V1 with respect to H1 in the first recess 302 and the ratio of V2 with respect to H2 in the second recess 303 are different from each other.

The foundation layer 31, the multilayer film 32, and the protective layer 33 are stacked on the surface 301 of the substrate 30 in the first region 21 and the second region 22. More specifically, after the foundation layer 31 is formed at the surface 301, the multilayer film 32 including the color absorption film 321 and the color adjustment film 322 are formed through ion-assisted deposition, ion plating vapor deposition, vacuum deposition, a sputtering method and the like. Thereafter, the protective layer 33 is stacked on the surface of the multilayer film 32. In this manner, the dial 2 can be manufactured.

Further, the watch 1 can be manufactured by using the dial 2 manufactured by the above-described manufacturing method for the watch 1.

In this embodiment, by forming the first recess 302 and the second recess 303 through processing such as cutting processing, laser processing, chemical removal processing, polishing processing, and forging or casting processing, the inclination of the oblique sides D1 and D2 in the first recess 302 and the second recess 303 can be arbitrarily changed.

Figure 9:
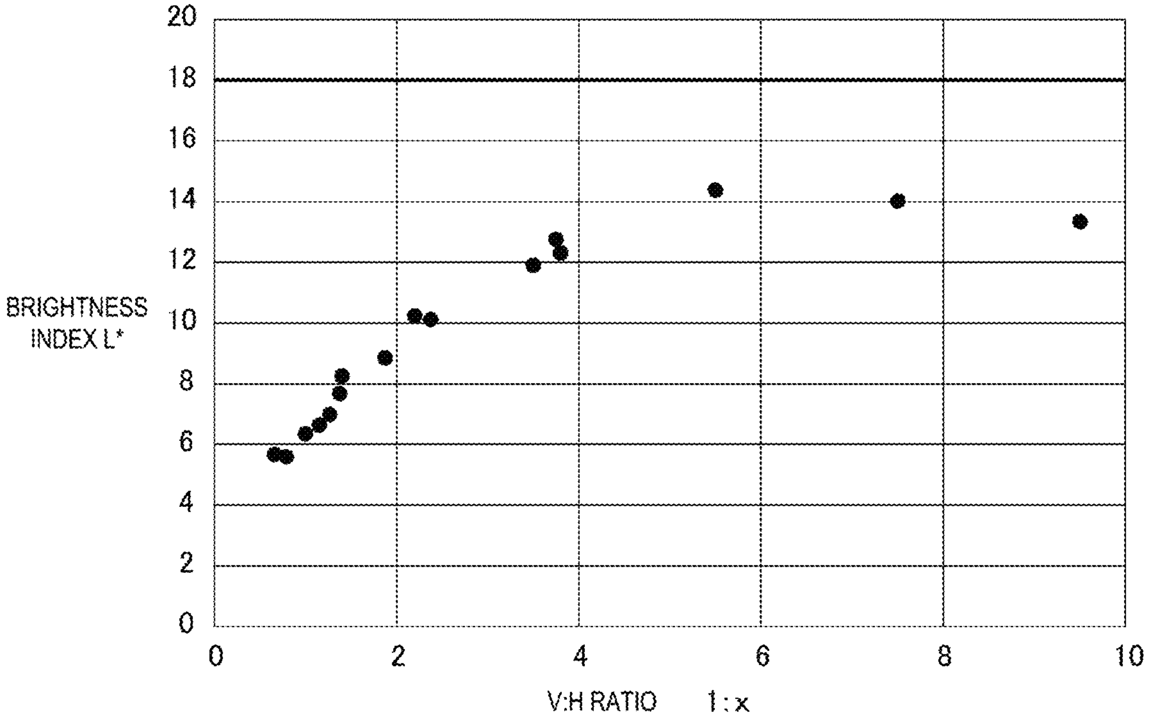
FIG. 9 is a diagram showing a relationship between a brightness L* and a ratio of a length V of the oblique side in the thickness direction of a substrate and a length H of the oblique side in the direction orthogonal to the thickness direction of the substrate.

FIG. 9 is a diagram showing a relationship between the brightness L* and the ratio of the length V of the oblique side D in the thickness direction of the substrate and the length H of the oblique side D in the direction orthogonal to the thickness direction of the substrate. In FIG. 9, the recess was formed in the substrate formed with brass such that the ratio of the length V of the oblique side in the thickness direction of the substrate and the length H of the oblique side in the direction orthogonal to the thickness direction of the substrate is 1:1 to 1:10, and a foundation layer, a multilayer film, and a protective layer were stacked on the surface of the substrate to measure the brightness L*. Note that the measurement of the brightness L* was performed with a spectroscopic colorimeter on a measurement condition with a specular reflection light measurement, a light source D65, and a viewing angle of 10 degrees.

Here, in FIG. 9, the multilayer film has a configuration the same as or similar to those of the color absorption film 321 and the color adjustment film 322 illustrated in FIGS. 4 and 7, and is formed such that when the multilayer film is disposed on a plane, the value of the brightness L* is 20 in plan view as viewed from the thickness direction of the multilayer film. Specifically, with the multilayer film alone, it is difficult to set the value of the brightness L* to a value less than 20. In addition, the substrate in which the recess is formed is formed such that the value of the brightness L* is 32 in plan view as viewed from the thickness direction of the substrate in the state where the multilayer film is not stacked.

Note that in the present disclosure, the brightness L* is a brightness value in a L*a*b* color space defined by CIE (Commission Internationale d'Eclairage; International Commission on Illumination). When the value of L* is "0", it is the brightness of an object that reflects no light (completely absorbs the light). When the value of L* is "100", it is a value of the brightness of white that totally reflects light.

As shown in FIG. 9, it was suggested that the greater the length ratio of the length V of the oblique side in the thickness direction of the substrate 30 with respect to the length H of the oblique side D in the direction orthogonal to the thickness direction of the substrate 30, the less the value of the brightness L*. In particular, it was suggested that when the length ratio of the length V of the oblique side in the thickness direction of the substrate 30 with respect to the length H of the oblique side D in the direction orthogonal to the thickness direction of the substrate 30 is greater than 1:6 and less than 1:1, (in FIG. 9, the region between 1 to 6 of the abscissa indicating the V:H ratio), i.e., when the ratio of the length V of the oblique side D along the thickness direction of the substrate 30 with respect to the length H of the oblique side D along the direction orthogonal to the thickness direction of the substrate 30 is greater than 1/6 and less than 1, the value of the brightness L* can be set to a value 5 or greater and 20 or less. The reason for this is surmised that when the length ratio of the length V of the oblique side in the thickness direction of the substrate with respect to the length H of the oblique side with respect to the direction orthogonal to the thickness direction of the substrate is increased, the inclination of the oblique side D with respect to the straight line side L is increased, and thus the reflectance of light incident on the recess can be reduced.

Further, it is surmised that since the multilayer film includes three layers of the chromium color absorption film composed of a material including Cr, and also a plurality of portions where the chromium color absorption film and the aluminum oxide color adjustment film are stacked, the reflectance of light incident on the multilayer film can be reduced, and the value of the brightness L* of the multilayer film itself can be set to a value as low as 18.

In this manner, in this embodiment, the first region and the second region in the substrate has a black color with low brightness in plan view as viewed from the thickness direction of the substrate.

In this embodiment, as described above, the first recess 302 and the second recess 303 are formed such that the ratio of V1 with respect to H1 in the first recess 302 and the ratio of V2 with respect to H2 in the second recess 303 are different from each other. In this manner, the reflection angle of light incident on the first recess 302 and the reflection angle of light incident on the second recess 303 are different from each other, and thus the reflectance of incident light can be changed between the first recess 302 and the second recess 303. Thus, black patterns with slight brightness differences can be formed with the first region 21 and the second region 22.

Operational Effects of Embodiment

According to the above-described embodiment, the following effects can be achieved.

In this embodiment, the substrate 30 includes the first region 21 where the plurality of first recesses 302 is formed, and the second region 22 where the plurality of second recesses 303 is formed. In plan view as viewed from the thickness direction of the substrate 30, the first region 21 and the second region 22 have a value of the brightness L* of 5 or greater and 20 or less. In this manner, the first region 21 and the second region 22 in the substrate 30 have a low brightness and a black color. Here, the first recess 302 in the first region 21 is defined by the first straight side L1, and the first oblique side D1 tilted with respect to the first straight side L1 and being in contact with the first straight side L1 at an end portion. In addition, the second recess 303 in the second region 22 is defined by the second straight line side L2, and the second oblique side D2 tilted with respect to the second straight line side L2 and being in contact with the second straight line side L2 at an end portion. The angle θ1 of the inclination of the first oblique side D1 with respect to the direction orthogonal to the thickness direction of the substrate 30 and the angle θ2 of the inclination of the second oblique side D2 with respect to the direction orthogonal to the thickness direction of the substrate 30 are different from each other. In this manner, the reflection angle of light incident on the first recess 302 and the reflection angle of light incident on the second recess 303 are different from each other, and thus the reflectance of incident light can be changed between the first recess 302 and the second recess 303. Thus, black patterns with slight brightness differences can be formed with the first region 21 and the second region 22.

In this embodiment, the first recess 302 is formed such that the ratio of the length V1 of the first oblique side D1 with respect to the thickness direction of the substrate 30 and the length H1 of the first oblique side D1 with respect to the direction orthogonal to the thickness direction of the substrate 30 is greater than 1:6 and less than 1:1. It is formed such that the ratio of the length V1 of the first oblique side D1 along the thickness direction of the substrate 30 with respect to the length H1 of the first oblique side D1 along the direction orthogonal to the thickness direction of the substrate 30 is greater than 1/6 and less than 1. In addition, the second recess 303 is formed such that the ratio of the length V2 of the second oblique side D2 along the thickness direction of the substrate 30 with respect to the length H2 of the second oblique side D2 along the direction orthogonal to the thickness direction of the substrate 30 is greater than 1/6 and less than 1. In this manner, the reflectance of light incident on the first recess 302 and the second recess 303 can be reduced, and thus the first region 21 and the second region 22 can have a black color with low brightness.

In this embodiment, the multilayer film 32 includes the color adjustment film 322 composed of a material including at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, or $NdF_3$, and thus the stability and durability of the external appearance of as the dial 2 can be increased. Further, the range of the variation of the black with low values of the brightness L* can be increased.

In this embodiment, the multilayer film 32 includes the color absorption film 321 composed of a material including at least one of Cr, Ag, Pt, Au, Cu, Al, Cr, Sn, Fe, or Ti, and thus a luxurious appearance of the dial 2 can be achieved.

In this embodiment, the multilayer film 32 includes three or more layers of the chromium color absorption film 3211 composed of a material including Cr, and thus the reflectance of light incident on the multilayer film 32 can be reduced. In this manner, the reflectance of light incident on the first recess 302 and the second recess 303 can be reduced, and thus the first region 21 and the second region 22 can have a black color with low brightness.

In this embodiment, the multilayer film 32 includes a plurality of portions where the chromium color absorption film 3211 and the aluminum oxide color adjustment film 3221 are stacked, and thus the multilayer film 32 can reduce the reflectance of light incident on the multilayer film 32 and have a black color with a much lower value of the brightness L*.

In this embodiment, the first recess 302 and the second recess 303 are formed through any one of cutting processing, laser processing, chemical removal processing, polishing processing, or forging or casting processing. In this manner, the inclinations of the first oblique side D1 in the first recess 302 and the second oblique side D2 in the second recess 303 can be arbitrarily changed.

In this embodiment, the multilayer film 32 is formed through any one of ion-assisted deposition, ion plating vapor deposition, vacuum deposition, or a sputtering method. In this manner, the layer composition of the multilayer film 32 can be arbitrarily changed.

Second Embodiment

Next, a second embodiment of the present disclosure is described with reference to FIGS. 10 and 11. The second embodiment is different from the above-described first embodiment in that the first recess 302A in the first region 21A is defined by a first side L3 and a second side D3 with curved shapes.

Note that in the second embodiment, components the same as or similar to those of the first embodiment are denoted with the same reference numerals, and the description will be omitted or simplified.

First Region

Figure 10:
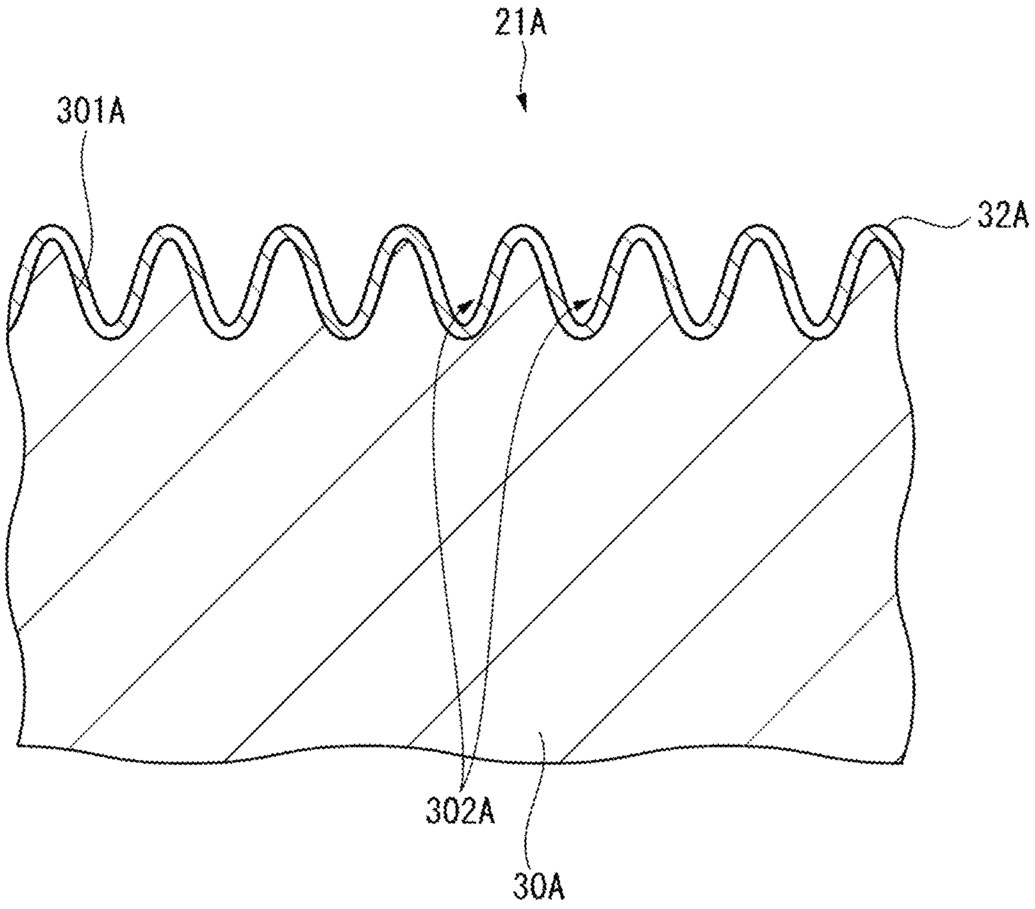
FIG. 10 is a cross-sectional view illustrating a main part of a first region of a dial of the second embodiment.
Figure 11:
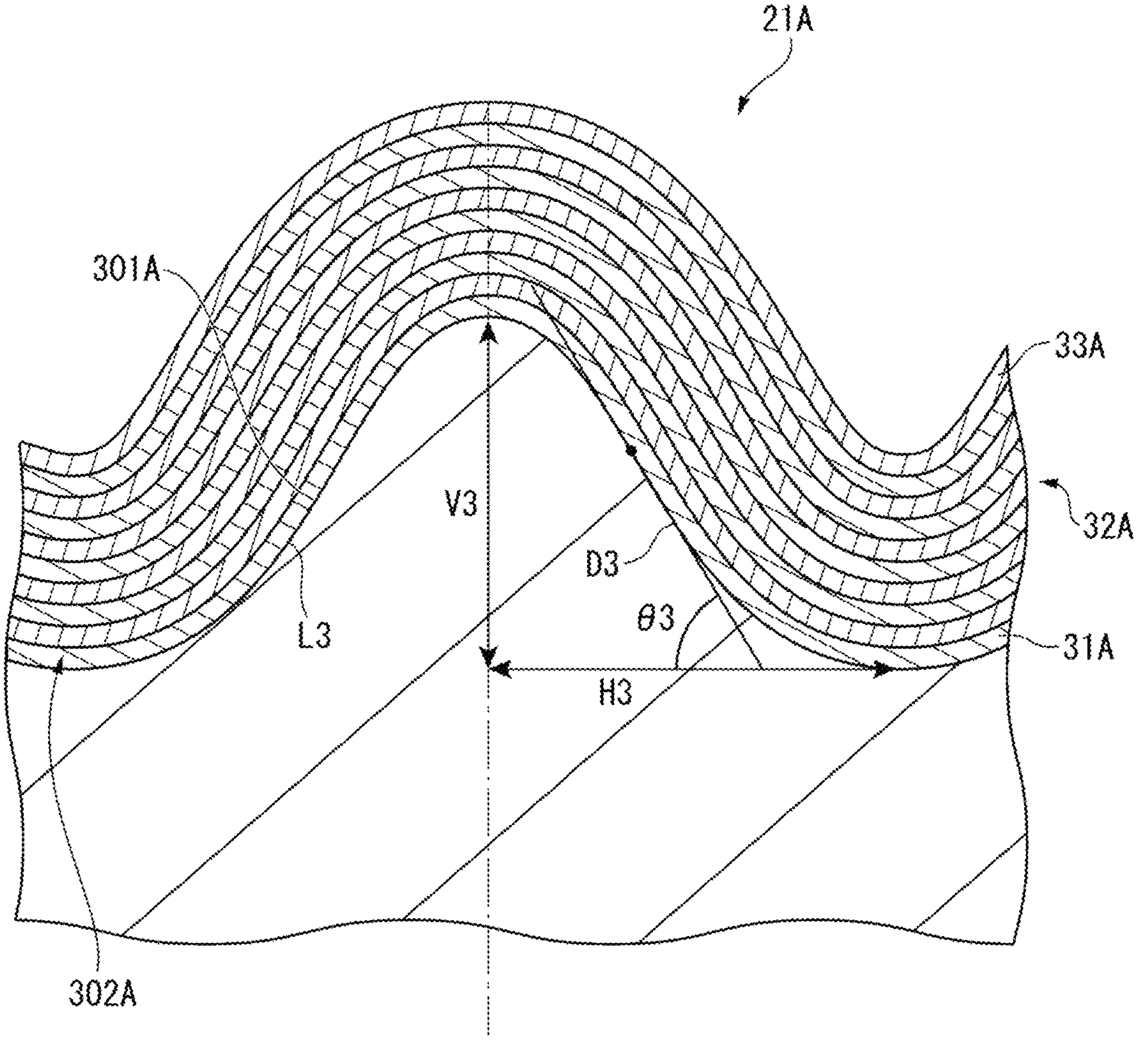
FIG. 11 is an enlarged cross-sectional view illustrating a main part of the first region of the dial of the second embodiment.

FIG. 10 is a cross-sectional view illustrating a main part of the first region 21A, and FIG. 11 is an enlarged cross-sectional view illustrating a main part of the first region 21A. Note that FIGS. 10 and 11 are cross-sectional views obtained by cutting the substrate 30A in the first region 21A in the thickness direction.

As illustrated in FIGS. 10 and 11, the first region 21A includes the substrate 30A, the foundation layer 31A, the multilayer film 32A, and the protective layer 33A as in the above-described first embodiment.

First Recess

The first recess 302A is defined by the first side L3, and the second side D3 tilted with respect to the first side L3 and being in contact with the first side L3 at an end portion in a cross-sectional view obtained by cutting the substrate 30A in the thickness direction. In this embodiment, the first side L3 and the second side D3 are curved.

In addition, as in the above-described first embodiment, the first recess 302A is formed such that a plurality of cone-shaped protrusions is formed at the surface 301A.

Note that although not illustrated in the drawing, in this embodiment, the first side and the second side that define the second recess in the second region are also curved.

As in the above-described first embodiment, the first recess 302A is formed such that the ratio of a length V3 of the second side D3 along the thickness direction of the substrate 30A with respect to a length H3 of the second side D3 along the direction orthogonal to the thickness direction of the substrate 30A is greater than 1/6 and less than 1. Specifically, the first recess 302 is formed such that the ratio of V3 and H3 is greater than 1:6 and less than 1:1.

In this embodiment, the angle of the tangent at the middle point of the second side D3 to the direction orthogonal to the thickness direction of the substrate 30A is θ3. The first recess 302A and the second recess are formed such that the angle θ3 is greater than the angle θ between the tangent at the middle point of the second side in the second region and the direction orthogonal to the thickness direction of the substrate 30A.

Operational Effects of Second Embodiment

According to the above-described embodiment, the following effects can be achieved.

In this embodiment, the first side L3 and the second side D3 that define the first recess 302A are curved. In this manner, since the sides defining the first recess 302A are not limited to straight lines, greater flexibility in the processing for forming the first recess 302A can be achieved.

Modifications

Note that the present disclosure is not limited to the above-described embodiments, and may be modified and changed in so far as the advantages of the present disclosure can be achieved.

In the above-described embodiments, the first recesses 302 and 302A and the second recess 303 are formed through any one of cutting processing, laser processing, chemical removal processing, polishing processing, or forging or casting processing, but this is not limitative. For example, the first recess and the second recess may be formed through femtolaser processing or picolaser processing. In this manner, the inclination of the second side in the first recess and the inclination of the fourth side in the second recess can be changed with higher accuracy.

In the above-described each embodiment, the first region 21 and the second region 22 are formed in the body part of the dial 2, but this is not limitative. For example, the first region may be configured as an hour mark part, and the second region may be configured as a dial body part. Alternatively, the first region may be configured as a mark part representing a company name or the like, and the second region may be configured as a dial body part. Further, the watch component of the present disclosure may be configured as a dial and a hand, with the first region configured as a hand and the second region configured as a dial body part.

In the above-described each embodiment, the first recess 302 and the second recess 303 are formed such that the angle θ1 of the first oblique side D1 in the first recess 302 of the first region 21 is greater than the angle θ2 of the second oblique side D2 in the second recess 303 of the second region 22, but this is not limitative. For example, the first recess and the second recess may be formed such that the angle of the second side in the second recess of the second region is greater than the angle of the first side in the first recess of the first region.

In the above-described embodiment, the watch component of the present disclosure is configured as the dial 2, but this is not limitative. For example, the watch component of the present disclosure may be configured as one of a case, a dial ring, a glass edge, a movement, a handle, an abbreviation, or an oscillating weight.

Overview of Present Disclosure

A watch component of the present disclosure includes: a substrate including a first region where a plurality of first recesses is formed in a surface, and a second region where a plurality of second recesses is formed in the surface, and a multilayer film covering at least a part of the first region and the second region, in which, in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and in plan view as viewed from the thickness direction of the substrate, the first region and the second region have a value of a brightness L* in a L*a*b* color space of 5 or greater and 20 or less.

In the present disclosure, the substrate includes the first region where the plurality of first recesses is formed, and the second region where the plurality of second recesses is formed. In plan view as viewed from the thickness direction of the substrate, the first region and the second region have a value of the brightness L* in the L*a*b* color space of 5 or greater and 20 or less. In this manner, the first region and the second region in the substrate have a low brightness and a black color. Here, the first recess in the first region is defined by the first side and the second side tilted with respect to the first side and being in contact with the first side at an end portion, and the second recess in the second region is defined by the third side and the fourth side tilted with respect to the third side and being in contact with the third side at an end portion. The angle of the inclination of the second side with respect to the direction orthogonal to the thickness direction of the substrate, and the angle of the inclination of the fourth side with respect to the direction orthogonal to the thickness direction of the substrate are different from each other. In this manner, since the reflection angle of the light incident on the first recess and the reflection angle of the light incident on the second recess are different from each other, the reflectance of incident light can be changed between the first recess and the second recess. Thus, black patterns with slight brightness differences of the first region and the second region can be formed.

In the watch component of the present disclosure, in the cross-sectional view, a ratio of a length of the second side along the thickness direction of the substrate with respect to a length of the second side along the direction orthogonal to the thickness direction of the substrate may be greater than 1/6 and less than 1, and in the cross-sectional view, a ratio of a length of the fourth side along the thickness direction of the substrate with respect to a length of the fourth side along the direction orthogonal to the thickness direction of the substrate may be greater than 1/6 and less than 1.

In this manner, the reflectance of light incident on the first recess and the second recess can be reduced, and the first region and the second region can have a black color with low brightness.

In the watch component of the present disclosure, the watch component may be configured as a dial, the first region may be configured as an hour mark part, and the second region may be configured as a dial body part.

In the watch component of the present disclosure, the watch component may be configured as a dial, the first region may be configured as a mark part, and the second region may be configured as a dial body part.

In the watch component of the present disclosure, the watch component may be configured as a dial and a hand, the first region may be configured as a hand, and the second region may be configured as a dial body part.

In the watch component of the present disclosure, the multilayer film may include a color adjustment film composed of a material including at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, or $NdF_3$.

In this manner, since these inorganic substances have high chemical stability, high stability and durability of the external appearance as a watch component can be achieved. Further, the range of the variation of the black with low values of the brightness L* can be increased.

In the watch component of the present disclosure, the multilayer film may include a color absorption film composed of a material including at least one of Cr, Ag, Pt, Au, Cu, Al, Cr, Sn, Fe, or Ti.

In this manner, a luxurious appearance as a watch component can be achieved.

In the watch component of the present disclosure, the color absorption film may include three or more layers of a film composed of a material including Cr.

In this manner, since the multilayer film includes three or more layers of the color absorption film composed of a material including Cr, the reflectance of light incident on the multilayer film can be reduced. In this manner, the reflectance of light incident on the first recess and the second recess can be reduced, and the first region and the second region can have a black color with low brightness.

Claim 9

The watch component of the present disclosure may further include a plurality of portions where the color absorption film composed of a material including Cr and the color adjustment film composed of a material including $Al_2O_3$ are stacked.

In this manner, the reflectance of light incident on the multilayer film can be reduced, and a black color with a much lower value of the brightness L* can be provided.

A watch component of the present disclosure includes: a substrate including a first region where a plurality of first recesses is formed in a surface, and a second region where a plurality of second recesses is formed in the surface, and a multilayer film covering at least a part of the first region and the second region, in which, in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and the multilayer film includes three or more layers of a color absorption film composed of a material including Cr. In the present disclosure, the substrate includes the first region where the plurality of first recesses is formed, and the second region where the plurality of second recesses is formed. At least a part of the first region and the second region is covered with the multilayer film. In this case, since the multilayer film includes three or more layers of the color absorption film composed of a material including Cr, the reflectance of light incident on the multilayer film can be reduced. In this manner, the first region and the second region in the substrate have a low brightness and a black color. Here, the first recess in the first region is defined by the first side and the second side tilted with respect to the first side and being in contact with the first side at an end portion, and the second recess in the second region is defined by the third side and the fourth side tilted with respect to the third side and being in contact with the third side at an end portion. The angle of the inclination of the second side with respect to the direction orthogonal to the thickness direction of the substrate, and the angle of the inclination of the fourth side with respect to the direction orthogonal to the thickness direction of the substrate are different from each other. In this manner, since the reflection angle of the light incident on the first recess and the reflection angle of the light incident on the second recess are different from each other, the reflectance of incident light can be changed between the first recess and the second recess. Thus, black patterns with slight brightness differences of the first region and the second region can be formed.

A watch of the present disclosure includes the watch component described above.

A method for manufacturing a watch component of the present disclosure is a method for manufacturing a watch component, the watch component including: a substrate including a first region where a plurality of first recesses is formed in a surface, and a second region where a plurality of second recesses is formed in the surface, and a multilayer film covering at least a part of the first region and the second region, the method including: forming the plurality of first recesses and the plurality of second recesses in a surface of the substrate, and stacking the multilayer film in at least a part of the first region of the substrate where the plurality of first recesses is formed and the second region of the substrate where the plurality of second recesses is formed, in which, in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and in plan view as viewed from the thickness direction of the substrate, the first region and the second region have a value of a brightness L* in a L*a*b* color space of 5 or greater and 20 or less.

In the present disclosure, the substrate includes the first region where the plurality of first recesses is formed, and the second region where the plurality of second recesses is formed. At least a part of the first region and the second region is covered with the multilayer film. In this case, since the multilayer film includes three or more layers of the color absorption film composed of a material including Cr, the reflectance of light incident on the multilayer film can be reduced. In this manner, the first region and the second region in the substrate have a low brightness and a black color. Here, the first recess in the first region is defined by the first side and the second side tilted with respect to the first side and being in contact with the first side at an end portion, and the second recess in the second region is defined by the third side and the fourth side tilted with respect to the third side and being in contact with the third side at an end portion. The angle of the inclination of the second side with respect to the direction orthogonal to the thickness direction of the substrate, and the angle of the inclination of the fourth side with respect to the direction orthogonal to the thickness direction of the substrate are different from each other. In this manner, since the reflection angle of the light incident on the first recess and the reflection angle of the light incident on the second recess are different from each other, the reflectance of incident light can be changed between the first recess and the second recess. Thus, black patterns with slight brightness differences of the first region and the second region can be formed.

A method for manufacturing a watch component of the present disclosure is a method for manufacturing a watch component, the watch component including: a substrate including a first region where a plurality of first recesses is formed in a surface, and a second region where a plurality of second recesses is formed in the surface, and a multilayer film covering at least a part of the first region and the second region, the method including: forming the plurality of first recesses and the plurality of second recesses in a surface of the substrate, and stacking the multilayer film in at least a part of the first region of the substrate where the plurality of first recesses is formed and the second region of the substrate where the plurality of second recesses is formed, in which, in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and the multilayer film includes three or more layers of a color absorption film composed of a material including Cr.

In the present disclosure, the substrate includes the first region where the plurality of first recesses is formed, and the second region where the plurality of second recesses is formed. At least a part of the first region and the second region is covered with the multilayer film. In this case, since the multilayer film includes three or more layers of the color absorption film composed of a material including Cr, the reflectance of light incident on the multilayer film can be reduced. In this manner, the first region and the second region in the substrate have a low brightness and a black color. Here, the first recess in the first region is defined by the first side and the second side tilted with respect to the first side and being in contact with the first side at an end portion, and the second recess in the second region is defined by the third side and the fourth side tilted with respect to the third side and being in contact with the third side at an end portion. The angle of the inclination of the second side with respect to the direction orthogonal to the thickness direction of the substrate, and the angle of the inclination of the fourth side with respect to the direction orthogonal to the thickness direction of the substrate are different from each other. In this manner, since the reflection angle of the light incident on the first recess and the reflection angle of the light incident on the second recess are different from each other, the reflectance of incident light can be changed between the first recess and the second recess. Thus, black patterns with slight brightness differences of the first region and the second region can be formed.

In the method for manufacturing the watch component of the present disclosure, the first recess and the second recess may be formed through any one of cutting processing, laser processing, patterning processing, chemical removal processing, polishing processing, or forging or casting processing.

In this manner, the inclination of the second side in the first recess and the inclination of the fourth side in the second recess can be arbitrarily changed.

In the method for manufacturing the watch component of the present disclosure, the first recess and the second recess may be formed through femtolaser processing or picolaser processing.

In this manner, the inclination of the second side in the first recess and the inclination of the fourth side in the second recess can be changed with higher accuracy.

In the method for manufacturing the watch component of the present disclosure, the multilayer film may be formed through any one of ion-assisted deposition, ion plating vapor deposition, vacuum deposition, or a sputtering method.

In this manner, the layer composition of the multilayer film can be arbitrarily changed.

A watch of the present disclosure includes a watch component manufactured by the above-described method for manufacturing a watch component.

What is claimed is:

1. A watch component comprising:

a substrate including a first region where a plurality of first recesses is formed in a surface, and a second region where a plurality of second recesses is formed in the surface; and a multilayer film covering at least a part of the first region and the second region, wherein in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and in plan view as viewed from the thickness direction of the substrate, the first region and the second region have a value of a brightness L* in a L*a*b* color space of 5 or greater and 20 or less.

2. The watch component according to claim 1, wherein in the cross-sectional view, a ratio of a length of the second side along the thickness direction of the substrate with respect to a length of the second side along the direction orthogonal to the thickness direction of the substrate is greater than 1/6 and less than 1 and in the cross-sectional view, a ratio of a length of the fourth side along the thickness direction of the substrate with respect to a length of the fourth side along the direction orthogonal to the thickness direction of the substrate is greater than 1/6 and less than 1.

3. The watch component according to claim 1, wherein the watch component is configured as a dial, the first region is configured as an hour mark part, and the second region is configured as a dial body part.

4. The watch component according to claim 1, wherein the watch component is configured as a dial, the first region is configured as a mark part, and the second region is configured as a dial body part.

5. The watch component according to claim 1, wherein the watch component is configured as a dial and a hand, the first region is configured as a hand, and the second region is configured as a dial body part.

6. The watch component according to claim 1, wherein the multilayer film includes a color adjustment film composed of a material including at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, or $NdF_3$.

7. The watch component according to claim 6, wherein the multilayer film includes a color absorption film composed of a material including at least one of Cr, Ag, Pt, Au, Cu, Al, Cr, Sn, Fe, or Ti.

8. The watch component according to claim 7, wherein the color absorption film includes three or more layers of a film composed of a material including Cr.

9. The watch component according to claim 8, further comprising a plurality of portions where the color absorption film composed of a material including Cr and the color adjustment film composed of a material including $Al_2O_3$ are stacked.

10. A watch component comprising:

a substrate including a first region where a plurality of first recesses is formed in a surface, and a second region where a plurality of second recesses is formed in the surface; and a multilayer film covering at least a part of the first region and the second region, wherein in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and the multilayer film includes three or more layers of a color absorption film composed of a material including Cr.

11. A watch comprising the watch component according to claim 1.

12. A method for manufacturing a watch component, the watch component including:

a substrate including a first region where a plurality of first recesses is formed in a surface, and a second region where a plurality of second recesses is formed in the surface and a multilayer film covering at least a part of the first region and the second region, the method comprising:

forming the plurality of first recesses and the plurality of second recesses in a surface of the substrate; and stacking the multilayer film in at least a part of the first region of the substrate where the plurality of first recesses is formed and the second region of the substrate where the plurality of second recesses is formed, wherein in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and in plan view as viewed from the thickness direction of the substrate, the first region and the second region have a value of a brightness L* in a L*a*b* color space of 5 or greater and 20 or less.

13. A method for manufacturing a watch component, the watch component including:

a substrate including a first region where a plurality of first recesses is formed in a surface, and a second region where a plurality of second recesses is formed in the surface and a multilayer film covering at least a part of the first region and the second region, the method comprising:

forming the plurality of first recesses and the plurality of second recesses in a surface of the substrate; and stacking the multilayer film in at least a part of the first region of the substrate where the plurality of first recesses is formed and the second region of the substrate where the plurality of second recesses is formed, wherein in a cross-sectional view obtained by cutting the substrate in a thickness direction, the plurality of first recesses is defined by a first side, and a second side tilted with respect to the first side and being in contact with the first side at an end portion, in the cross-sectional view, the plurality of second recesses is defined by a third side, and a fourth side tilted with respect to the third side and being in contact with the third side at an end portion, in the cross-sectional view, an angle of an inclination of the second side with respect to a direction orthogonal to the thickness direction of the substrate and an angle of an inclination of the fourth side with respect to the direction orthogonal to the thickness direction of the substrate are different from each other, and the multilayer film includes three or more layers of a color absorption film composed of a material including Cr.

14. The method for manufacturing a watch component according to claim 12, wherein the plurality of first recesses and the plurality of second recesses are formed through any one of cutting processing, laser processing, patterning processing, chemical removal processing, polishing processing, or forging or casting processing.

15. The method for manufacturing a watch component according to claim 14, wherein the plurality of first recesses and the plurality of second recesses are formed through femtolaser processing or picolaser processing.

16. The method for manufacturing a watch component according to claim 12, wherein the multilayer film is formed through any one of ion-assisted deposition, ion plating vapor deposition, vacuum deposition, or a sputtering method.

17. A watch including a watch component manufactured by the method for manufacturing a watch component according to claim 12.

* * * * *